Patented Aug. 14, 1928.

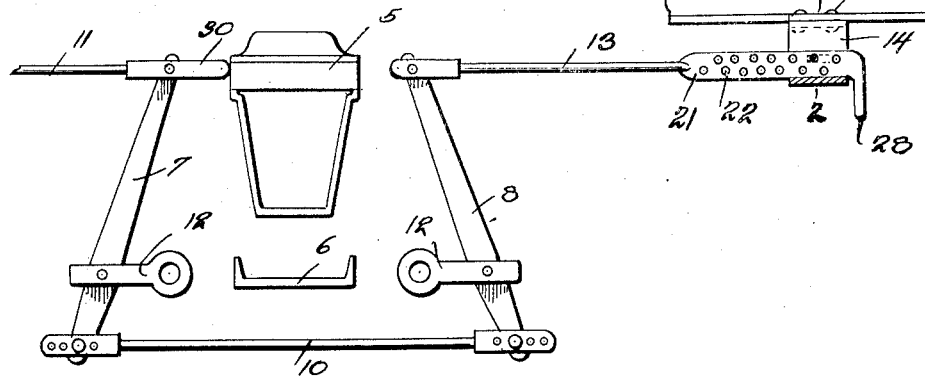
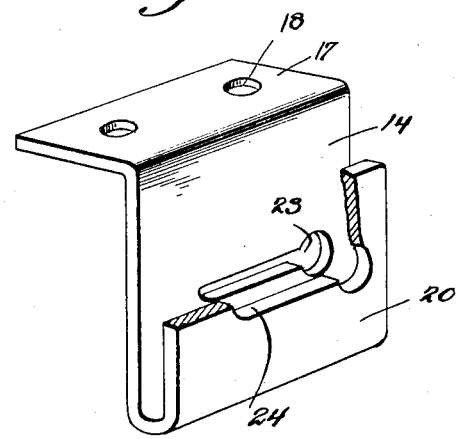
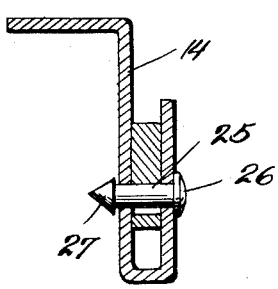

1,681,060

UNITED STATES PATENT OFFICE.

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE.

REGULATOR FOR BRAKE RIGGING.

Application filed December 16, 1927. Serial No. 240,464.

This invention relates to improvements in regulators for the foundation brake gear of railway vehicles and will hereinafter be described with particular reference to its application to the truck brake rigging, altho it is, of course, to be understood that many of the features thereof are applicable to other parts of the brake rigging, such, for example, as the cylinder levers.

One of the objects of the present invention is to provide a regulator of the above general character of simple and practical construction which may be inexpensively manufactured, assembled and installed.

A further object of the present invention is to provide a regulator of the above general character which may be easily and quickly applied to brake rigging now in use without material changes, substitution or alteration.

A further object is to provide a regulator which may be conveniently actuated from a point such as near one end of the car without necessitating the operator going beneath the car body.

A further object is to provide a regulator of the above character which will be safe, reliable and efficient in operation and use.

A further object is to provide a regulator which will positively and properly position the brake levers of the truck so as to insure predetermined brake shoe clearance at all times.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the views, of which—

Fig. 1 is a semi-diagrammatic sectional elevation of a truck and such parts of the associated brake rigging as may be necessary to fully understand the invention;

Figs. 2 and 3 are detail sectional views taken substantially along line 2—2 of Fig. 1; and Fig. 4 is a detail perspective view of one of the parts with a portion broken away.

Referring now to the drawing in detail and more particularly to Fig. 1, 5 indicates the usual truck bolster of conventional form located at one end of a car and above a spring plank 6. At opposite sides of this bolster are positioned brake levers which include a live lever 7 and a dead lever 8 connected at their lower ends by a push rod 10. The live lever is actuated by means of a pull rod 11 connected to one of the cylinder levers (not shown). The truck brake levers are of course provided with brake beams indicated at 12, which are in turn equipped with brake shoes for engaging the peripheries of the wheels all in a well known manner.

The upper end of the dead lever is anchored in relatively fixed position, and as herein shown, this anchorage comprises a regulator rod 13 supported in a bracket 14 riveted or otherwise secured at 15 to the under side of the draft or center sill 16. This support in the present case includes a flat sheet metal body member 14 provided with a lateral offset surface 17 having holes 18 thru which the rivets 15 are adapted to pass. The body portion is also bent back upon itself as indicated at 20, to provide a U-shaped bracket as shown clearly in Fig. 4. This bracket supports a flattened portion 21 of the regulating rod 13, which portion is provided with a plurality of holes 22 preferably arranged in staggered relation as indicated in the drawings, thereby to provide or permit a closer adjustment or regulation than would be obtainable by merely placing the holes in a substantially straight line.

The bracket formed by the parts 14 and 20 is provided with registering key hole openings, that is, each opening has a round or enlarged head portion 23 and an elongated slot 24, thereby to permit the insertion of a holding pin 25 having a shank portion of a diameter substantially equal to the width of the slot, a headed portion 26 at one end greater than the hole 23, and an enlarged flanged point 27 at its opposite end. The head 26 may be of any desired size larger than the hole 23, but the pointed end 27 should be of a size substantially equal to or slightly less than the diameter of this hole, whereby, when inserted into position, it will by reason of the pointed end easily pass thru the holes 23 and the registering hole 22 in the flattened portion 21, and then freely slide longitudinally along the key hole slot 24 whereby a removal of this pin 25 is prevented until a handle 28 is actuated to draw the pin back into registry with the holes 23 during the regulating movement. This slot 24 preferably has a length proportional to normal brake shoe clearance, that is, if the brake shoe clearance is one-fourth or three-eighths of an inch at each wheel, then this slot is of such length as to permit the total absorption of all brake shoe clearance when the pin 25 is moved into registration with the opening 23.

In operation, when it is desired to regulate the brakes, the handle 28 is moved relatively towards the right, thereby to bring the pin 25 into registry with the openings 23. This should absorb all of the brake shoe clearance if the brakes are in properly regulated condition. On the other hand, if the excess travel exists, then on removal of the pin 25 the regulating rod is permitted to have a further movement towards the right proportional to the excess travel or until stop means for the lever 7 such as the elongated end 30 of the rod 11 engages against the bolster 5.

One of the objects of this stop construction is to limit the regulating movement to the particular truck with which the regulator is connected and thereby prevent a disturbance of the angularity of the cylinder levers or the truck brake rigging at the opposite end of the car. In other words, the regulator and the stop means 30 cooperate, one with the other, to permit the absorption of all excess travel of the truck brake rigging of one truck only and without disturbing the remaining parts of the foundation brake gear.

When all of this excess travel has been taken up, the pin 25 is again inserted thru the openings 23 and either an upper or lower opening 22 in the flattened portion of the regulator rod 13 whichever is most accessible and in registry with the opening 23. The parts then take the position as shown in Figs. 2 or 3, the pin being moved along the slots 24 by reason of the gravitating action of the truck brake levers. In this manner, the brake shoes drop clear from the periphery of the wheels and assume a position giving predetermined brake shoe clearance at all points.

From the above, it will be seen that a simple practical mechanism is provided for positively giving the desired brake shoe clearance at all points of the truck without disturbing the angularity of the remaining brake levers, the opposite end of the car being of course provided with a corresponding mechanism.

Inasmuch as the levers 7 and 8 always occupy an unbalanced relation tending to swing towards the bolster, there is positively no danger of the cotterless pin 25 moving towards the openings 23 except when forcibly actuated by means of a pull on the handle 28. Further, the flanged head 27 would not normally pass out thru these openings by reason of the shoulder at its base. Consequently, the device is thoroughly reliable and safe at all times, and is well adapted to accomplish, among others, all of the objects and advantages herein set forth.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a regulator for brake rigging, in combination, a regulating rod having holes therein, a support, a member cooperating with said support and rod including a pin and slot holding means providing a lost motion movement relative to said support substantially proportional to total brake shoe clearance.

2. In a regulator for brake rigging, in combination, a regulating rod having holes therein, a support, a member cooperating with said support and holes having a lost motion relative to the car body substantially proportional to total brake shoe clearance, and means directly associated with one of the levers of the brake rigging for preventing the transmission of the regulating movement beyond a predetermined point.

3. In a regulator for brake rigging, in combination, a support on the under side of the car body, a regulating rod cooperating with said support and having a plurality of holes therein, said support having an elongated opening, and a pin cooperating with said opening, and an opening in the rod for holding the same in adjusted position.

4. In a regulator for brake rigging, in combination, a support on the under side of the car body, a regulating rod cooperating with said support and having a plurality of holes therein, said support having a keyhole opening, and a pin cooperating with said key-hole opening and an opening in the regulator rod for holding the same in adjusted position, the head of the key-hole opening being located remotely from normal position of rest and the length of the opening being proportional to total brake shoe clearance.

5. In a regulator for truck brake rigging, in combination, a support on the under side of the car body, a regulating rod cooperating with said support and having a plurality of holes therein, said support having a key-hole opening, a pin cooperating with said key-hole opening and an opening in the regulator rod for holding the same in adjusted position, the head of the key-hole opening being located remotely from normal position of rest and the length of the opening being proportional to total brake shoe clearance, and stop means for preventing the regulating movement being transmitted to the foundation brake gear beyond truck brake rigging.

6. In a regulator for truck brake rigging, in combination, live and dead levers positioned at opposite sides of a truck bolster, the regulating movement of one of which is adapted to be limited by said bolster, a manually actuated regulator comprising a rod having a portion provided with a plurality of holes, a U-shaped supporting bracket in which said portion rests, said bracket having registering slots therein, and a pin coacting with any one of said openings and said slots whereby the same may be moved to regulated position as desired.

7. In a regulator for truck brake rigging, in combination, live and dead levers positioned at opposite sides of a truck bolster, the regulating movement of one of which is adapted to be limited by said bolster, a manually actuated regulator comprising a rod having a flattened portion provided with a plurality of holes, a U-shaped supporting bracket in which said flattened portion rests, said bracket having registering slots therein, a pin normally coacting with one opening and said slots whereby the same may be moved to regulated position as desired, the said slots being of key-hole shape with the head remotely positioned with relation to the brake rigging, and said pin being provided with enlargements at its ends, one of which is free to pass thru the head of the slot but not thru the body portion.

8. In a regulator of the character described, in combination, a rod having a plurality of openings, a support for said rod having a key-hole slot, and a pin adapted to pass thru the head of the key-hole and said openings as desired and move along the key-hole slot to holding position.

9. In a regulator of the character described, in combination, a rod having a plurality of openings, a support for said rod having a key-hole slot, and a pin adapted to pass thru the head of the key-hole and said openings and move along the slot to normal position, said pin having an enlarged head coacting with one side of said support, and an enlargement at the opposite end substantially equal to the diameter of the head of the key-hole opening, whereby a removal of the pin is normally prevented except when the parts are in predetermined relation to said head.

10. In a regulator of the character described, in combination, a member associated with the brake rigging having a plurality of openings, a support for said member having an elongated slot of a length substantially proportional to total brake shoe clearance, a pin adapted to pass thru said elongated slot and one of said openings as desired and move along said slot to holding position, and means adapted to prevent accidental removal of said pin.

11. In a regulator of the character described, in combination, a brake lever associated therewith having a plurality of openings arranged in staggered position for convenience of adjustment, a supporting member cooperating with said first mentioned member having an elongated slot, a pin adapted to pass thru said elongated slot and one of said openings as desired and to move along said slot to normal position a distance substantially proportional to total brake shoe clearance, thereby to hold the brakes in regulated position, and means normally preventing accidental removal of said pin.

12. In a regulator of the character described, in combination, a member associated with a brake lever having a plurality of openings, a support for said member having an opening, a pin adapted to pass thru said member and one of said openings in said member as desired, said pin and openings constituting a lost motion means associated with said support and member substantially equal to total brake shoe clearance, and means adapted to prevent accidental removal of said pin.

13. In a regulator of the character described, in combination, a member associated with one of the truck brake levers having a plurality of openings, a support connected with the car body for said member and having an opening therein, a pin adapted to pass thru the opening in the support and one of the openings in said member when brought into registry, said pin and opening providing a lost motion means substantially equal to total brake shoe clearance whereby after the device is actuated predetermined brake shoe clearance is insured.

14. In a regulator of the character described, in combination, a member associated with the brake rigging, a supporting member therefor, one of said members having a plurality of regulating holes and the other having an elongated hole substantially proportional to total desired brake shoe clearance, a pin passing thru said elongated hole and one of said regulating holes when brought into registry and adapted to move along said elongated hole to holding position to thus insure brake shoe clearance, and means adapted to prevent accidental removal of said pin.

15. In a regulator of the character described, in combination, a member associated with one of the truck brake levers having a plurality of openings, a support connected with the car body for said member and having an opening therein, a pin adapted to pass thru the openings in the support and one of the openings in said member when brought into registry, said pin and openings providing a lost motion means substantially equal to total brake shoe clearance whereby after the device is actuated predetermined brake shoe clearance is insured, and means cooperating with said pin adapted to prevent accidental removal thereof.

16. In a regulator of the character described, in combination, a member associated with one of the truck brake levers having a plurality of openings, a support connected with the car body for said member and having an opening therein, a pin adapted to pass thru the opening in the support and one of the openings in said member when brought into registry, said pin and opening providing a lost motion means substantially equal to total brake shoe clearance whereby after the device is actuated predetermined brake shoe clearance is insured, and means cooperating with the truck brake rigging adapted to prevent the regulating movement from disturbing the angularity of the cylinder levers or truck brake rigging at the opposite end of the car.

17. In a regulator of the character described, in combination, a member associated with the brake rigging having a plurality of openings arranged in staggered position for convenience of adjustment, a supporting member cooperating with said first mentioned member having an opening therein, a pin adapted to pass thru openings in both of said members when brought into registry, said pin and openings providing a definite predetermined lost motion substantially equal to total brake shoe clearance whereby brake shoe clearance is insured after regulation.

18. In a regulator of the character described, in combination, a member associated with the brake rigging having a plurality of openings, a support for said member having openings therein, a pin adapted to pass thru registering openings in said parts as desired, the openings in one of said parts being of a length substantially proportional to total brake shoe clearance, thus providing a lost motion insuring such brake shoe clearance, and means adapted to prevent accidental removal of said pin.

19. In a regulator of the character described, in combination, a member associated with the brake rigging having a plurality of openings arranged in staggered position for convenience of adjustment, a supporting member cooperating with said first mentioned member having an opening therein, a pin adapted to pass thru said openings in both of said members when brought into registry, said pin and openings providing a definite predetermined lost motion substantially equal to total brake shoe clearance whereby brake shoe clearance is insured after regulation, and means associated with said pin adapted to prevent removal thereof when in holding position.

20. In a regulator of the character described, in combination, a member associated with the brake rigging, a supporting member therefor, one of said members having a plurality of regulating holes and the other having an elongated hole substantially proportional to total desired brake shoe clearance, a pin passing thru said elongated hole and one of said regulating holes when brought into registry and adapted to move along said elongated hole to holding position to thus insure brake shoe clearance, means adapted to prevent accidental removal of said pin, and means associated with the brake rigging adapted to prevent the regulating action from being transmitted beyond the truck brake rigging with which said regulator is connected.

Signed at New York, N. Y., this 10th day of December, 1927.

WILLIAM H. SAUVAGE.